(12) United States Patent
Katz

(10) Patent No.: US 11,691,113 B2
(45) Date of Patent: Jul. 4, 2023

(54) SYSTEM APPARATUS AND METHOD SUITABLE FOR CAPTURING WATER ENERGY

(71) Applicant: Katz Water Tech, LLC, Houston, TX (US)

(72) Inventor: Gary P. Katz, Houston, TX (US)

(73) Assignee: Katz Water Tech, LLC, Houston, TX (US)

(*) Notice: Subject to any disclaimer, the term of this patent is extended or adjusted under 35 U.S.C. 154(b) by 0 days.

(21) Appl. No.: 17/493,844

(22) Filed: Oct. 5, 2021

(65) Prior Publication Data

US 2022/0023808 A1 Jan. 27, 2022

Related U.S. Application Data

(63) Continuation of application No. 16/400,029, filed on Apr. 30, 2019, now Pat. No. 11,135,557, which is a
(Continued)

(51) Int. Cl.
*F03B 13/00* (2006.01)
*B01F 23/451* (2022.01)
(Continued)

(52) U.S. Cl.
CPC .......... *B01F 25/102* (2022.01); *B01F 23/451* (2022.01); *B01F 23/452* (2022.01);
(Continued)

(58) Field of Classification Search
CPC .... B01F 25/102; B01F 23/451; B01F 23/452; B01F 25/41; B01F 23/483; F03B 13/00; F05B 2220/602; F05B 2240/123; F05B 2240/124; F05B 2240/131; F05B 2240/97; Y02B 10/50; Y02E 10/20; Y02E 10/30
See application file for complete search history.

(56) References Cited

U.S. PATENT DOCUMENTS 4,051,810 A 10/1977 Breit
4,189,379 A 2/1980 Finley
(Continued)

FOREIGN PATENT DOCUMENTS

EP 0328178 1/1989
EP 959048 2/2000

*Primary Examiner* — Michael C Zarroli
(74) *Attorney, Agent, or Firm* — Gary P. Katz; Katz Law Group, LLC

(57) ABSTRACT

An apparatus, system, and method to capture water power from head or pressure is provided utilizing pipes, inlets, and outlets. The apparatus comprises a central bore having an internal diameter suitable for a fluid flow, the fluid flow moves inside the central bore through the apparatus, and at least one outlet, the fluid flow exits the apparatus through the at least one outlet, optionally, a plurality of inlets for flowing additional fluid to the central bore mix the fluid flow with the additional fluid from the plurality of inlets. The apparatus can further mix the fluid through additional mixing devices and additional devices can be used to recapture energy such as hydroelectric power from the fluid flow. The system and method can capture water energy from the fluid flow.

20 Claims, 10 Drawing Sheets

Related U.S. Application Data continuation of application No. 15/331,889, filed on Oct. 23, 2016, now Pat. No. 10,272,396.

(60) Provisional application No. 62/245,285, filed on Oct. 23, 2015.

(51) Int. Cl.
  *B01F 25/41* (2022.01)
  *B01F 25/10* (2022.01)
  *B01F 23/45* (2022.01)
  *B01F 23/40* (2022.01)

(52) U.S. Cl.
  CPC .............. *B01F 25/41* (2022.01); *F03B 13/00* (2013.01); *B01F 23/483* (2022.01); *F05B 2220/602* (2013.01); *F05B 2240/123* (2013.01); *F05B 2240/124* (2013.01); *F05B 2240/131* (2013.01); *F05B 2240/97* (2013.01); *Y02B 10/50* (2013.01); *Y02E 10/20* (2013.01)

(56) References Cited

U.S. PATENT DOCUMENTS

| | | |
|---|---|---|
| 4,245,475 A | 1/1981 | Girden |
| 4,311,012 A | 1/1982 | Finley |
| 4,703,626 A | 11/1987 | Jensen |
| 6,313,545 B1 | 11/2001 | Alstot et al. |
| 6,348,148 B1 | 2/2002 | Bosley |
| 6,510,687 B1 | 1/2003 | Zaslavsky et al. |
| 6,559,554 B2 | 5/2003 | Alstot et al. |
| 6,575,247 B2 | 6/2003 | Tolman et al. |
| 7,132,759 B2 | 11/2006 | Alstot et al. |
| 7,239,037 B2 | 7/2007 | Alstot et al. |
| 7,306,724 B2 | 12/2007 | Gordon |
| 7,329,962 B2 | 2/2008 | Alstot et al. |
| 7,476,323 B2 | 1/2009 | Gordon |
| 7,485,234 B2 | 2/2009 | Max |
| 7,510,658 B2 | 3/2009 | Gordon |
| 7,547,392 B2 | 6/2009 | Gordon |
| 7,898,102 B2 | 3/2011 | Alstot et al. |
| 7,969,029 B2 | 6/2011 | Vitagliano |
| 9,157,332 B2 | 10/2015 | Hanna |
| 9,328,624 B2 | 5/2016 | Finley |
| 2003/0173784 A1 | 9/2003 | Jones et al. |
| 2005/0082214 A1* | 4/2005 | Max .................. B01D 53/62 210/220 |
| 2008/0011681 A1 | 1/2008 | Gordon |
| 2015/0191380 A1 | 7/2015 | Glass |
| 2015/0252793 A1 | 9/2015 | Croker |
| 2016/0144098 A1* | 5/2016 | Radwanski ......... A61M 1/0218 210/651 |

* cited by examiner

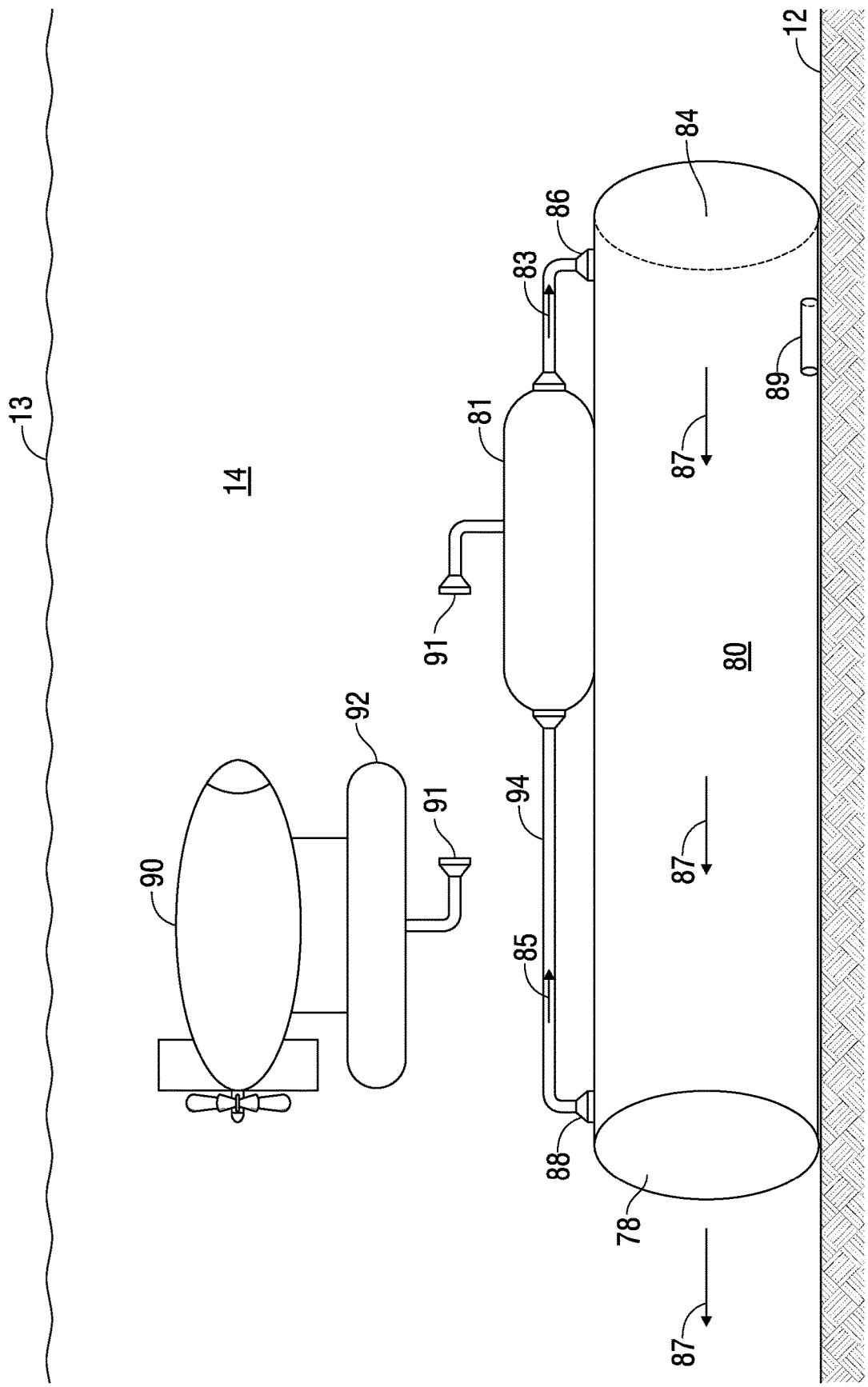

SYSTEM APPARATUS AND METHOD SUITABLE FOR CAPTURING WATER ENERGY

CROSS REFERENCE TO RELATED APPLICATIONS

The present application is a U.S. Non-Provisional Patent Application that is a continuation and claims priority to co-pending U.S. patent application Ser. No. 16/400,029, which issued on Oct. 5, 2021, as U.S. Pat. No. 11,135,557. U.S. Pat. No. 11,135,557 is incorporated in its entirety by reference, and which claims priority to U.S. patent application Ser. No. 15/331,889, which issued on Apr. 30, 2019, as U.S. Pat. No. 10,272,396. U.S. Pat. No. 10,272,396 is incorporated in its entirety by reference, and which claims priority to U.S. Provisional Patent Application Ser. No. 62/245,285, entitled "System Apparatus and Method Suitable for Reducing the Contaminate Concentration of Effluent Before Discharge" filed on Oct. 23, 2015, which is incorporated in its entirety by reference.

FIELD

This invention relates to the field of generating power using head. In one embodiment, the invention reduces the contaminate concentration of effluent before discharging at a point source. In another embodiment, this invention relates generally to the field of industrial waste water discharge, including desalination brine effluent. In a specific embodiment, this invention generally relates to using the total head of the discharge pipe consisting of the height above water and depth of the water to reduce the salinity of brine effluent before discharging back into the ocean while generating hydroelectric power. In another embodiment, the head of a wellbore is used to recapture energy of water discharged into a wellbore.

BACKGROUND

This section is intended to introduce the reader to various aspects of art, which may be associated with embodiments of the present invention. This discussion is believed to be helpful in providing the reader with information to facilitate a better understanding of embodiments of the present invention. Accordingly, these statements are to be read in this light, and not necessarily as admissions of prior art.

The world is running out of potable fresh water. Worldwide, an estimated 700 million people cannot obtain enough clean water. In the next 10 years, the number is projected to increase to approximately 1.8 billion. In some regions, obtaining fresh water from seawater may be the only viable way to significantly increase the supply.

In the United States, most of the West coast, especially California, has been in a severe long-term drought. This long-term drought has stressed the water resources of the region. The environmental damage includes damage to the ecology and hydrology from diminishing groundwater and aquifer water resources that are being excessively drained to provide the water requirements of individuals, agriculture and industry. Furthermore, the lack of sufficient water supply is hurting the economy by forcing the region to charge more for water resources and shutting down water intensive industries and businesses.

In the past, desalination plants have been proposed to resolve the fresh water resources problem. Reverse osmosis ("RO") plants have been delivering desalinated water for decades to regions with limited water resources. However, the high cost to build and operate the RO plants historically made the plants uneconomical for most regions. Accordingly, the major issue of RO technology is that it costs too much. The RO process requires significant energy to force salt water against polymer membranes that have pores small enough to let fresh water through while holding salt ions back.

New plants, using innovative technology, such as, the Sorek plant in Israel have significantly reduced the cost per cubic volume versus conventional desalination plants. The Sorek plant, with a capacity of over 150 million gallons per day of desalinated water, has significantly reduced energy consumption through technological advances and economies of scale using scalable designs. For example, the Sorek plant incorporates several engineering improvements that make it more efficient than previous RO facilities. This technology includes utilizing pressure tubes that are 16 inches in diameter rather than eight inches requiring only a fourth as much piping and other hardware, slashing costs. The facility uses highly efficient pumps and energy recovery devices. In addition, new technologies are being developed such as, advanced membranes made of atom-thick sheets of carbon, that potentially can further reduce the energy requirements of desalination plants.

While this technology has improved the economics of RO desalination, there are still many additional problems to be solved. One problem is the lack of available waterfront land in many regions from overdevelopment along the coastline and developmental restrictions including Not-In-My-Backyard or "NIMBYism." Offshore desalination has been proposed and desalination has been done on ships. There have been proposals to construct large-scale desalination plants on barges or offshore platforms.

The disposal of the highly concentrated salt brine that contains other chemicals used throughout the process has become a major environmental issue. Large coastal seawater desalination plants discharge brine into oceans and estuaries and therefore, technologies must be developed to provide safe disposal or discharge of brine effluent. Typically, twice as saline as the ocean, the brine discharge is denser than the waters into which brine is discharged and thus, tends to sink and slowly spread along the ocean floor, where there is typically minimal wave energy or currents to mix it. There are several proven methods to disperse concentrated brine, such as multi-port diffusers placed on the discharge pipe to promote mixing. Brine can also be diluted with effluent from a wastewater treatment plant or with cooling water from a power plant or another industrial user. Unfortunately, these approaches have not been shown to reduce the brine concentration sufficiently to prevent serious harm to marine life surrounding the point of discharge.

Accordingly, there is a need to provide offshore desalination, with the ability to efficiently reduce the salinity of the effluent brine discharge to avoid environmental issues for marine ecosystems, including killing marine organisms. In addition, there is a need to further reduce the operating costs including reducing the amount of power necessary to run the plant. Furthermore, there is a need to dilute wastewater offshore from maritime, offshore, and nearshore industrial activities, in addition to, desalination. Wellbores have been used to discharge fluids including contaminated fluids. There is also a need to mix brine in a wellbore to reduce scaling in a reservoir that causes losses in permeability. There is also a need to recapture the energy from the disposal of fluids in a wellbore. The multiple apparatus, method and system embodiments, disclosed herein, solves these needs.

SUMMARY

In one embodiment, an apparatus is disclosed. In this embodiment, the apparatus comprises: a discharge pipe wherein the discharge pipe has a plurality of inlets to mix discharge water moving through the discharge pipe with water introduced into the discharge pipe through at least one of the plurality of inlets. Furthermore, in one embodiment, a plurality of paddles are connected to at least one turbine generator, wherein the water flowing through the discharge pipes moves the paddles to create electricity before exiting the discharge pipe through an outlet.

In one embodiment, a method is disclosed. In this embodiment, the method comprises: obtaining a discharge pipe, wherein the discharge pipe comprises an inlet, outlet, plurality of inlets, and a plurality of paddles connected to at least one turbine generator; flowing discharge water through the discharge pipe; inserting water into the discharge pipe through the plurality of inlets to mix discharge water with the inserted water; moving the paddles with the discharge water to produce electricity; and exiting the discharged water mixed with the inserted water through the outlet. In another embodiment, an energy recapture device is used in the discharge pipe or wellbore to recapture energy.

In one embodiment, a system is disclosed. In this embodiment, the system comprises: a discharge pipe wherein the discharge pipe has a plurality of inlets and at least one mechanical mixing device to mix discharge water moving through the discharge pipe with water introduced into the discharge pipe through the plurality of inlets; in one embodiment, a plurality of paddles are connected to at least one turbine generator, wherein the water flowing through the discharge pipes moves the paddles to create electricity before exiting the discharge pipe through an outlet; and a control panel that controls, the plurality of inlets, the at least one mixing device, the plurality of paddles, or combinations thereof, to achieve favorable mixing of the discharged water and the water from the inlet, electrical generation, or combinations thereof.

DRAWINGS

The foregoing and other advantages of the present technique may become apparent upon reading the following detailed description and upon reference to the drawings in which:

FIG. 8 is an illustration of a compressed gas apparatus and system to control pressure and remove water from the alternative discharge pipe sections.

DESCRIPTION OF THE EMBODIMENTS

Figure 1:
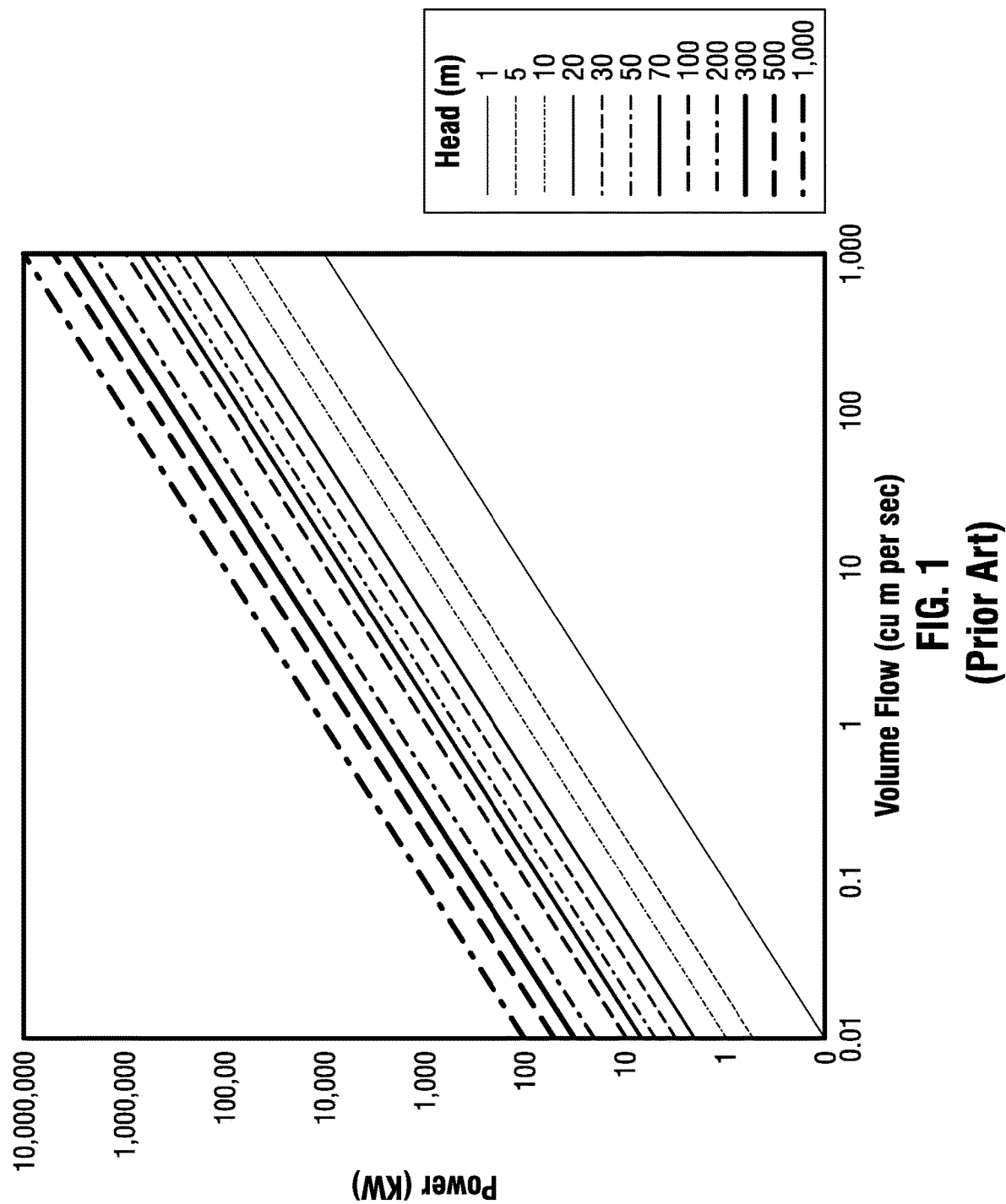
FIG. 1 illustrates a graph showing the relationship between hydroelectric power generation, head and volume of water flow.

Below is a description of various embodiments of the invention. Before describing selected embodiments of the present disclosure in detail, it is to be understood that the present invention is not limited to any embodiment described herein. The disclosure and description herein is illustrative and explanatory of one or more presently preferred embodiments and variations thereof, and it will be appreciated by those skilled in the art that various changes in the design, organization, means of operation, structures, location, methodology, and use of mechanical equivalents which may be made without departing from the spirit of the invention.

As well, it should further be understood that the drawings are intended to illustrate and plainly disclose presently preferred embodiments to one of skill in the art. These drawings are not intended to be manufacturing level drawings or renditions of final products and may include simplified conceptual views to facilitate understanding or explanation. The relative size and arrangement of the components may differ from that shown and will still operate within the spirit of the invention.

Moreover, it will be understood that various directions such as "upper", "lower", "bottom", "top", "left", "right", "first", "second" and so forth are made only with respect to explanation in conjunction with the drawings. The inventive components may be oriented differently. For example, during transportation and manufacturing as well as operation. Because many varying and different embodiments may be made within the scope of the concept(s) herein taught, and because many modifications may be made in the embodiments described herein, it is to be understood that the details herein are to be interpreted as illustrative and non-limiting. For example, many embodiments and examples are used to describe reducing the salinity of brine discharge from a desalinization plant. However, the invention can be used to handle any onshore or offshore effluent discharge including discharges from agriculture, municipal, energy, maritime and industrial activities.

One embodiment of the invention uses at least one structural device, such as baffles to forcefully mix seawater with brine discharge of the oil rig, plant or ship, including discharge from a desalination unit. Another option is to naturally mix the saltwater brine by allowing seawater or fresh water to gradually enter (or allowing seawater to enter at designated spots) into the discharge pipes before final discharge into the water at the point source. In one embodiment, the sea water is gradually introduced in stages, through openings in the discharge pipes. Preferably, the plurality of outlet(s) are designed to allow seawater into the discharge pipe while not allowing any brine discharge out of the discharge pipes. This can be accomplished by any device that allows fluid to flow in only one direction including, but not limited to, mechanical fluid diversion devices including funnels or pumps at the opening to utilize natural suction of moving water and/or gravity, one-way valves, or combinations thereof. One-way valves can include membranes, ball valves, flapper valves, poppet valves, any valve device that allows selective fluid flow, or combinations thereof.

Allowing water into the discharge pipe would naturally mix the water and cause the brine discharge to naturally lose salinity concentration over time and/or depth. In this embodiment, the discharge pipes would preferably expand, in interior diameter, as depth increases, to handle the increased fluid flow inside the discharge pipe. This can be accomplished by gradually increasing the diameter of the discharge pipe or by increasing the diameter of the discharge pipe in stages, using expanding pipes, at advantageous intervals. In one embodiment, the top of each expanding interval, or stage, would be at least one inlet that may, or may not, include a mechanical fluid diversion device or one-way valve, as discussed above. Preferably, these devices would allow seawater in but not allow any brine discharge out. However, the density difference between the seawater and salt water brine may prohibit sufficient mixing. One solution is to insert baffles or other mechanical devices, inside the discharge pipes, at, or near, the entrances where seawater is introduced into the discharge pipes to further increase mixing of the seawater and the brine discharge. Additional seawater introduction devices with, or without baffles, could be strategically places along on the walls of the discharge pipe to obtain a favorable mixing of seawater with the brine discharge. Potentially, if enough seawater is introduced and mixed with the saltwater discharge, the salinity of the discharged effluent would be reduced sufficiently enough that no additional devices are needed to discharge the now diluted brine discharge, as the discharge would be substantially the same as the saltwater.

Another option is to use the blades of hydroelectric turbine generators or energy recapture devices to both agitate and mix the sea water with the brine discharge of the desalination plant while generating hydroelectric power. In one embodiment, at least one, and more preferentially a plurality of hydroelectric generators are placed inside the discharge pipe, with paddles that move (or similar device to capture the water energy) from water flowing down the discharge pipe. The blades being turned will both mix the seawater and brine discharge and power the generators to provide electricity to the discharge plant. Hydroelectric power can be generated from vertical, horizontal and angular fluid flow. Therefore, the paddles and hydroelectric equipment can be places anywhere along the discharge pipes 120 and the alternatives pipe sections 80. GE Power manufactures and sells suitable generators that can be modified for use in the embodiments disclosed herein. The generators can be modified to entirely, or significantly fit, inside the discharge pipes 120 and the alternatives pipe sections 80 in the vertical position, horizontal position, or combination thereof. In addition, the equipment may require some modifications. Such modifications include, but are not limited to, the cooling system, electrical wiring, and the electrical grounding system. For example, the air cooling may need to be replaced will water cooling and the ground system would need to be adapted for the subsurface ocean.

In this embodiment, the amount of water introduced and the placement of turbines could be chosen to both maximize the mixing of the discharge brine with the salt water and maximize the amount of hydroelectric power that can be generated, based on the disclosures herein. Standard hydroelectric generators and blades could be obtained and then modified to protect water sensitive components from water intrusion and salt water corrosion. One option is protecting the generators using water proof housings. Another option would be to coat key components with hydrophobic gel to repel the water. Persons skilled in the art would recognize many options to modify existing and proposed hydroelectric generators to efficiently work in the various inventive embodiments, discussed below, with the benefit of the disclosures herein.

A significant factor to consider is the amount of potential available hydroelectric power. In considering potential hydroelectric power, the two most vital factors are the flow and the head of the moving fluids. Any increase in the amount of water flow and head available provides opportunities for additional power that can be generated.

The flow is the volume of water which can be captured, re-directed or utilized to turn the blade of the turbine generator, and the head is the distance the water will fall on its way to the generator. The larger the flow, the more water there is, and the higher the head, or the higher the distance the water falls, the more available energy there is for conversion to electricity. For example, doubling the flow doubles the available power and doubling the head doubles the available power. Preferable, the most efficient configuration for electrical generation would be to have only one massive set of paddles connected to only one turbine generators. However, design requirements and the need to for multiple mixing zones throughout the discharge pipe may require multiple sets of hydroelectric paddles connected to multiple hydroelectric turbine generators. Therefore, it is advantageous to introduce as much water as possible to increase flow as early as possible to obtain the most available head and thus, provide additional possible design configurations.

A low head section would for example, have a head of below 10 meters. In this case, increased volume of water flow is required to generate significant electricity. A low head section could be at the end of the discharge pipe where there is much flow. A high head section has a head of above 20 meters. In this case, a large flow of water is unnecessary because gravity provides an additional power boost. A high head section could be towards the beginning of the discharge pipe where there is not as much flow because seawater has not been introduced. This could be at the section nearest the discharge point of the desalination unit until the discharge pipe contacts the surface of the seawater. A person skilled in the art, with the benefit of the disclosure herein, would design the placement of the paddles of the hydroelectric turbine generator to maximize power generation while sustaining sufficient mixing to adequately reduce the salinity of the brine discharge.

The basic power generation formula is expressed in Equation (1) as follows:

$$\text{Power} = \text{Head} \times \text{Flow} \times \text{Gravity} \quad \text{Equation (1)}$$

Wherein
Power: is measured in Watts,
Head: is measured in meters,
Flow: is measured in liters per second, and
Acceleration: is due to gravity, and is measured in meters per second per second.

The acceleration due to gravity is approximately 9.81 meters per second per second, or for each second an object, (such as, water) is falling, its speed increases by 9.81 meters per second (until it hits its terminal velocity). The theoretical generation from hydroelectric power can similar be calculated using equation (2)

$$P_{th} = \rho q \, g \, h \quad \text{Equation (2)}$$

wherein $P_{th}$=power theoretically available (expressed in Watts)

ρ=density (kg/m³) (~1000 kg/m³ for water, ~1027 kg/m³, and higher for brine discharge based on salinity and temperature)

q=water flow (m³/s)

g=acceleration of gravity (9.81 m/s')

h=falling height, head (m)

The theoretical power in KW based on volume flow as (m³/s) and head (m) is show in FIG. 1. As shown in FIG. 1 and as discussed above, increasing head and/or fluid flow increases potential power generation. FIG. 1 shows the potential power from head ranging from 1 meter 1 to 1,000 meters 1000.

Hypothetical Example—Hydroelectric Power

A proposed 100 million gallons per day offshore desalination plant would produce 100 million gallons per day of brine effluent and would require approximately 50 to 100 million gallons per day to sufficiently dilute the salinity. Most likely, the offshore plant would be in at least 135 meters of water and possibly, in much deeper water. Therefore, theoretical power available from a flow of 150 million gallons per day (or 6.57 m³/s) of water falling 135 m can be calculated as $$P=(1027 \text{ kg/m}^3)(6.57 \text{ m}^3/\text{s})(9.81 \text{ m/s}^2)(135 \text{ m}) \quad \text{Equation (2)}$$

P=8,935,000 W=8935 kW=89 MW

Efficiency of the system should be taken into consideration. Due to energy loss, the actual available power will be less than the theoretical power. Actual available power can be expressed as shown in equation 3 as shown below:

$$P=1027 \mu q \, g \, h \quad \text{Equation (3)}$$

Wherein

P=power available (W)

μ=efficiency (in general ranging 0.75 to 0.95)

Equation (3) can be simplified to express practically available hydropower in KW as shown in Equation (4):

$$P \sim 10 \mu q \, h (kW) \quad \text{Equation (4)}$$

Assuming the lower end range of efficiency (μ) of 0.75, due to the efficiency losses of mixing, and the numbers discussed above, the plant would generate approximately 67 MW. 67 MW is enough to power the entire expected approximate average usage of 40 MW and return an approximate average of 27 MW of power to the power grid.

A 100 million gallons per day plant would require an estimated peak power of 50 MW and then gradually reduce to approximately 30 to 40 MW once full operational capacity is reached. From startup, normal operational capacity should take approximately one hour, and possibly more, depending on conditions. Until the plant has reached sufficient discharge output, sufficient startup power would be required. One option would be to have an electrical power, or umbilical cord, connecting the desalination platform to the power grid on the shore. Startup could be initiated during times of lower power usage to avoid stressing the local power grid and reduce expenses by buying power at cheaper rates. In regions where there is insufficient excess power in the power grid, or no power grid available, the power plant could be powered by a ship containing diesel or natural gas generators adjacent to the platform. For example, 4 diesel or natural gas portable diesel generators of 20 MW could be placed on a ship such as, a supply ship and used to power the installation, setup and startup of the plant. The extra power serves as a redundancy in the event one generators fails. Another option is to have diesel, or natural gas power generators, inside the platform to provide the start-up power. The exhaust and heat would need to be vented away from the plant.

Suitable platforms, or ships, would generally require a minimum depth of at least 100 feet, and more preferably, a minimum depth of at least 500 feet, and a maximum depth of 10,000 feet of water. Suitable platforms include but are not limited to ships, tension leg platforms, semi submersibles, barges and SPAR platforms. Therefore, the minimum amount of water depth that would provide the amount of head necessary to run a 100 million gallons per day desalination plant and provide excess power, would be at least approximately 50 meters, with a platform at least 10 meters high. In one embodiment, a power line with a quick disconnect would be attached to the platform to provide the initial startup power and then once the plant is running, excess power generated would be sold into the power grid. Assuming a depth of 135 meters and an estimated wholesale clean energy price of $100/MWH, the 100 million gallons per day plant would generate at least 20 MW of excess power. The estimated excess power would provide approximately $2,000 per hour in additional electrical power revenue, plus the additional benefit of reducing operating costs by powering the plant mostly through cogeneration. In addition, the carbon credits or Certified Emissions Reduction ("CER"), obtained from the generation of non-polluting hydroelectric power could be sold for additional revenue. The 67 MW, generated in this example, would be worth approximately $6.7 million annually, assuming a price of $47 worth of CER per KW generated. Obtaining and/or selling the CER or energy credits can be included in the methods described herein.

This embodiment envisions the placement of the paddles, or energy capture devices, connected to the power generators and the water introduction would be designed to obtain the most advantageous power generation, mixing of seawater and brine discharge while using the least amount of material for the discharge pipe, as possible. The power generation formula is based on the equations discussed above and fluid mixing is based on principles discussed below.

Fluid mixing is based on fluid dynamics using known principals of water mechanics influenced by temperature, salinity differences and amount of turbulence in the water. The water mixing would be designed based on lab experiments and physical modeling. Physical modeling is employed primarily for predicting mixing behavior. It consists of laboratory experiments using scale models that simulate the case being tested at a smaller scale. Tests can be carried out on any effluent, discharge configuration and ambient conditions. For discussions of physical modeling, see Ettema et al. (2000).

The type of material utilized should consider the cost and weight of the material used. For example, steel has high strength but is expensive and would be heavy requiring additional cost in moving the discharge pipes of the plant and additional structural support. Most likely, a plastic, or composite material, would be chosen because they provide a cheap easily workable material while providing sufficient strength, corrosion resistivity, and minimal weight. Examples of preferred suitable materials include, but are not limited to, lightweight and corrosion resistant metals, plastics, synthetics including composites, carbon fibers, or combinations thereof.

Embodiments of this invention can be used in any industrial process where effluent water needs dilution before discharges or where head allows for hydroelectric generation. Such applications include, but are not limited to, power plants, chemical plants, petrochemical plants, petroleum refineries, natural gas processing, and sewage treatment. All such usages are intended to be within the scope of the disclosure.

Figure 2:
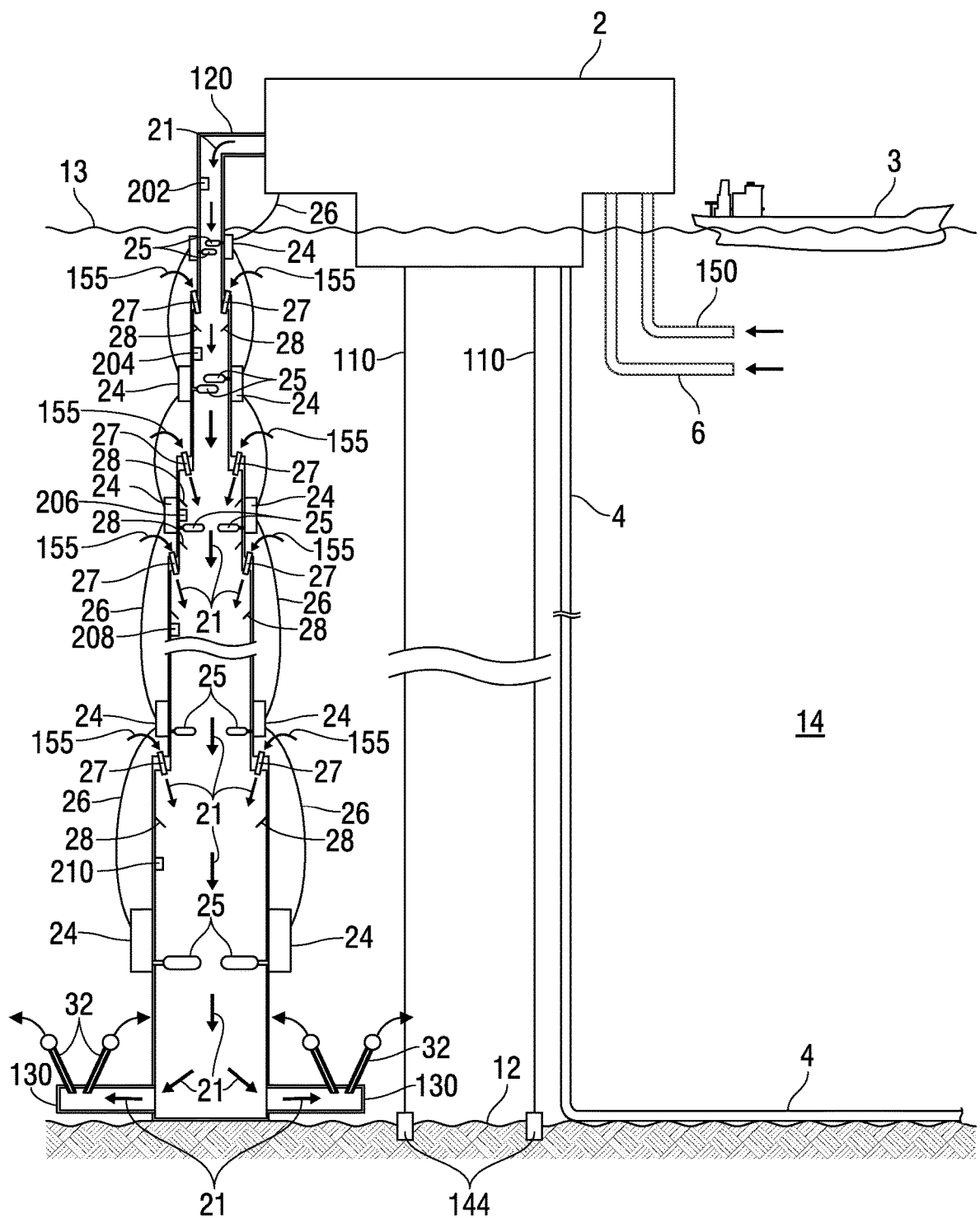
FIG. 2 illustrates an embodiment of this invention wherein an offshore desalination plant on a barge is connected to a discharge system comprising a telescoping pipe system with a plurality of hydroelectric generators that generate electrical power during the disposal of the brine effluent.

FIG. 2 illustrates a barge platform configuration embodiment of this invention. The barge, including a barge platform 2 would host an industrial plant, such as, a desalination plant. The barge platform 2 could be installed by a ship 3 such as, a tug boat or multi-purpose supply vessel. The ship 3 could also provide generators to initiate the necessary startup power until the cogeneration or hydroelectric turbine generators provide the necessary power to operate the plant on the barge 2. An electrical cable 4, or umbilical cord, can connect the platform with the power grid, or other utilities lines, such as, water on the coastline. Intake pipes (150 and 6) provide the saltwater necessary for the industrial operations such as, desalination on the platform 2. The intake pipes (150 and 6) would be sized and designed to favorably pump water. Factors to consider when deciding the size, depth and orientation of the intakes (150 and 6) include, but are not limited to, pressure, temperature, density, salinity, or combinations thereof. For energy consumption, the depth would be chosen to be as close as practical to the surface, as feasible, to avoid large and costly pumps that require additional energy. In one embodiment, the inlets would be at a depth of at least 5 meters but not more than 10 meters. The barge platform 2 can be tethered, with one or more tethers 110 with anchors 144 to the sea floor 12 to stabilize the barge platform 2 on the surface 13 of the water 14.

Wastewater, such as, brine discharge, from the desalination plant exits the barge platform 2 through one or more discharge pipes 120. The direction of discharge flow is shown with arrows 21. A plurality of hydroelectric turbine generators 24 are shown with the paddles 25 or other devices that are moved by fluid flow inside the discharge pipe 120 to move and/or power the components of the generators 24. The generators 24 are connected to the platform with cables for carrying electrical current. The cables 26 can be connected to the platform individually, or in series, or in parallel. There are many different hydroelectric generators and paddles available commercially and being proposed for future commercialization that would be suitable for this embodiment. All suitable systems that convert water flowing into usable energy are intended to be included in this embodiment. Paddles, for purposes of this application, shall be defined as any device(s) that can convert the energy of flowing water to power a generator to produce electrical power. In an alternative embodiment, energy recapture devices can store and capture pressure of the fluid flow in the pipes and reuse the pressure for pumps or use the pressure to generate electricity.

The discharge pipe 120 is shown telescoping outward as the depth or distance from the barge platform increases. Accordingly, the diameter of the pipe increases further away from the barge 2. In the embodiment shown, the beginning of each telescoping section has an inlet 27 to allow additional water into the discharge pipe at the top section of the larger diameter pipe connected to the lower section of the lower diameter pipe section.

In one embodiment, rifling inside the bores can be used to further increase circular fluid flow for mixing. In this embodiment, rifling can be manufacturing into the interior bores of the pipes, including the central bore and/or inlet bores to create additional circular fluid flow suitable to increase mixing.

The inlet device can include a one-way device, pump or be configured to mechanically or physically permit fluid flow in and prevent fluid flow out. Possible directions of flow are shown by arrows 155 into the inlet devices 27. Baffles, or other mechanical devices, below, one or more, of the inlets can flow the water through the inlet to forcibly mix with the discharge brine. The inlets can be designed to partially, or fully close, to prevent water flow based on the conditions and the needs of the discharge system, as discussed below. The baffles 29, or other mechanical mixing devices, can change the type of flow by changing the orientation, such as angle and direction of the fluid flow from the inlets 27 into and/or through the discharge pipes 120. In one embodiment, the baffles can be operated by a control system, as described below.

Figure 3:
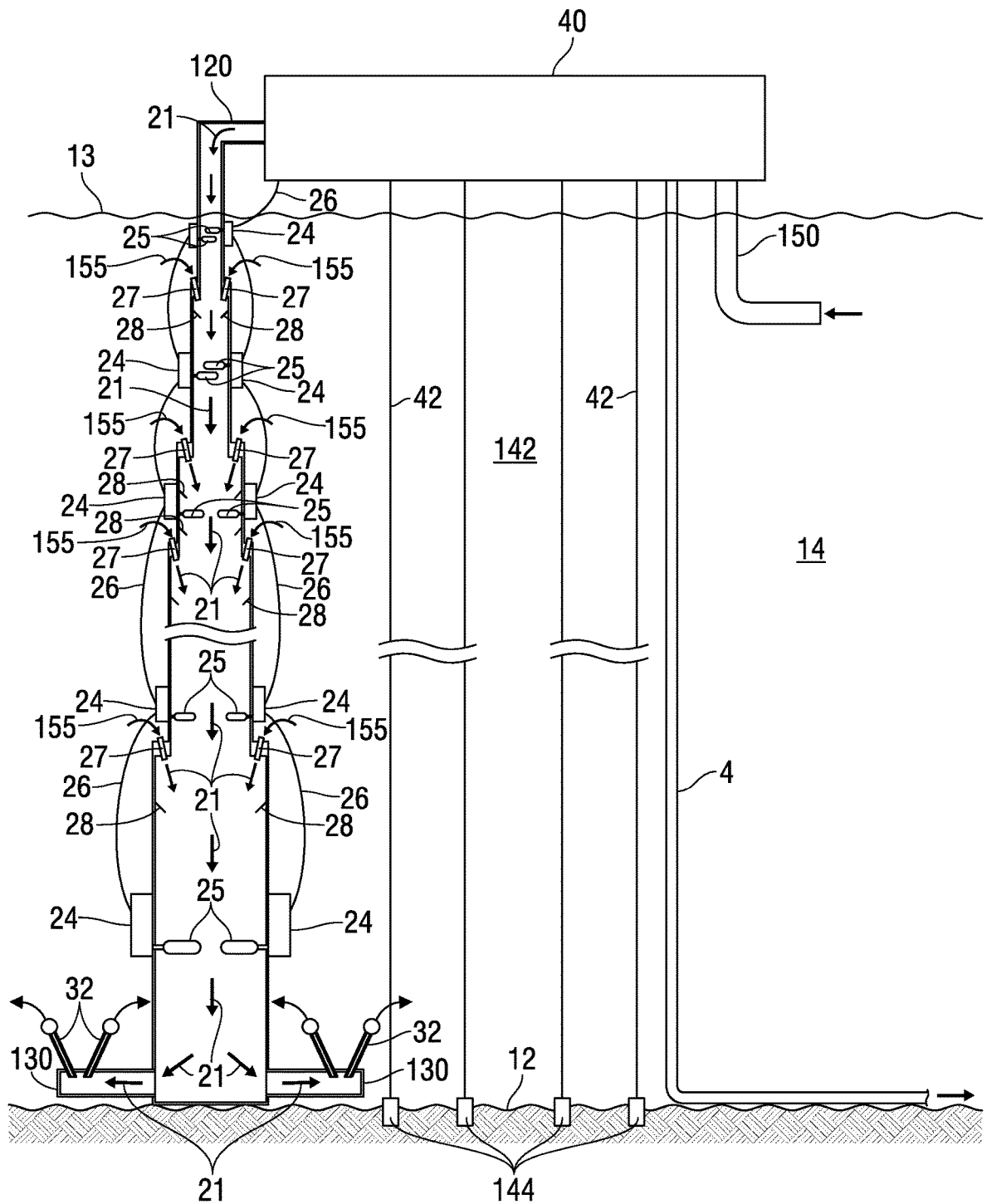
FIG. 3 illustrates an embodiment of this invention wherein an offshore tension leg platform is connected to a discharge system comprising a telescoping pipe system with a plurality of hydroelectric generators that generate electrical power during the disposal of the effluent from the platform.

FIG. 3 shows a tension leg platform with the similar elements in FIG. 2 shown with the same reference numerals. In the embodiment, shown in FIG. 3, a tension leg platform 40 is shown with a plurality of tension leg such as, pipes, or tethers 42 with anchors 144 to the sea floor 12. In this embodiment, the paddles 25 of the hydroelectric generators 24 are shown below the inlets 27 and baffles 28 to maximize mixing of the seawater with the discharge water by creating additional turbulent flow substantially at, or below, the inlets 27.

To efficiently mix the brine discharge and the water from the inlet, turbidity flow should be created. In one embodiment, radial and/or tangential flow is created to increase turbidity and thus, mixing. Radial flow causes circular mixing, like using a spoon to mix tea and sugar to create a vortex for mixing. Tangential flow causes discharge water to forcible mix at right angles or directly through direct contact with the water flowing through the inlet.

Figure 4A:
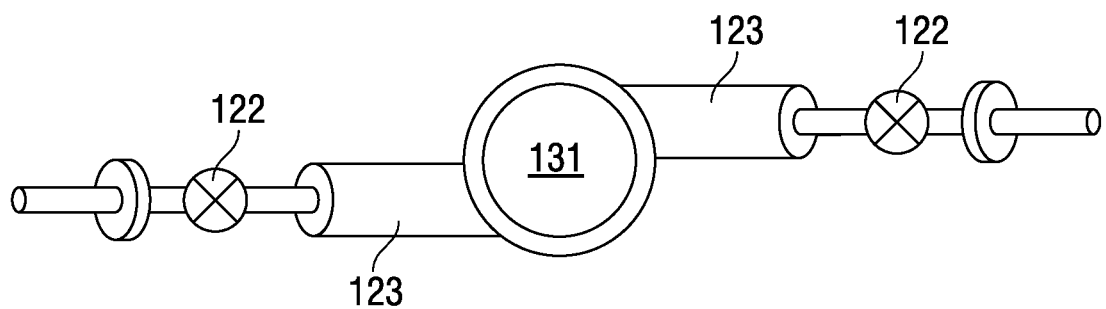
FIGS. 4A-4C illustrate embodiments wherein the inlets, to the discharge pipes, are attached to the exterior of the discharge pipes.
Figure 4B:
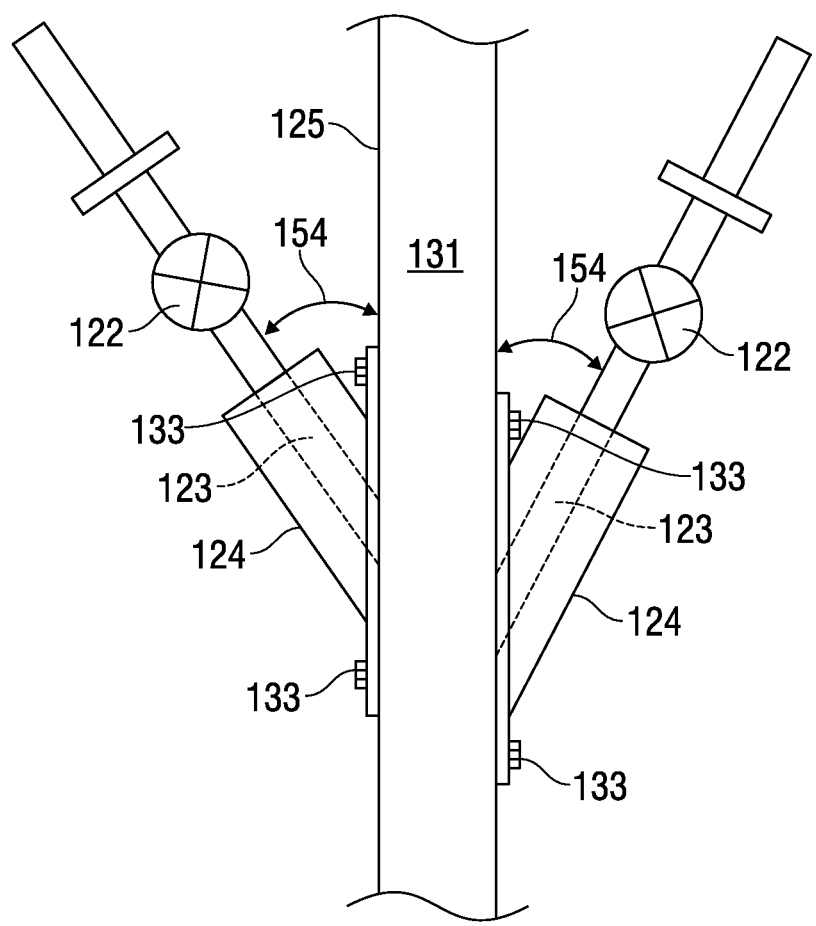
Figure 4C:
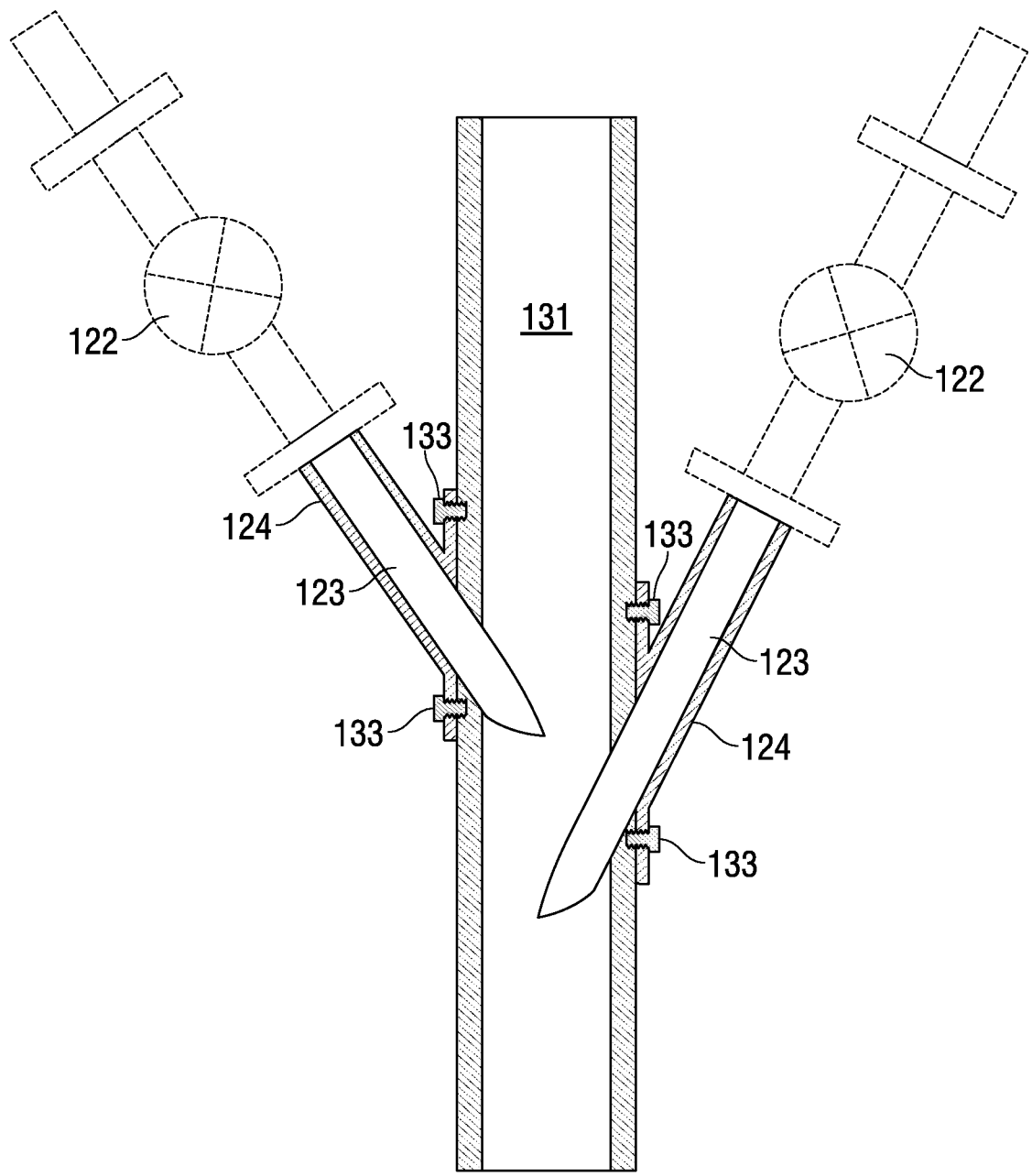
Figure 5A:
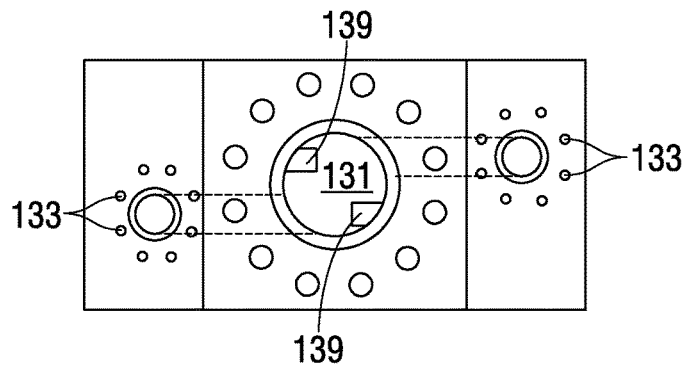
FIGS. 5A-5E illustrate embodiments wherein the inlets attached to the discharge pipes, are made from a billet of steel.
Figure 5B:
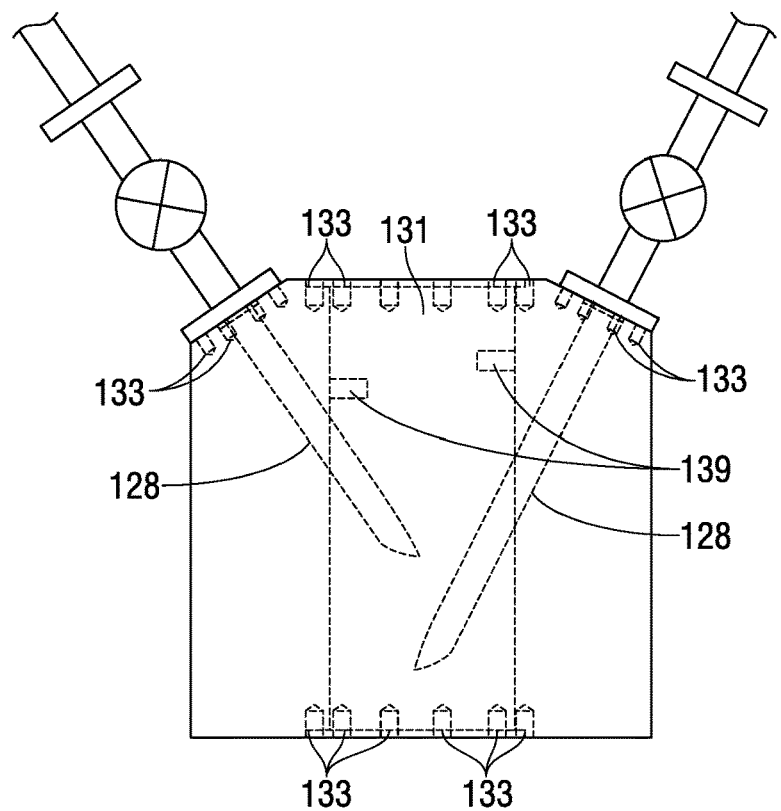
Figure 5C:
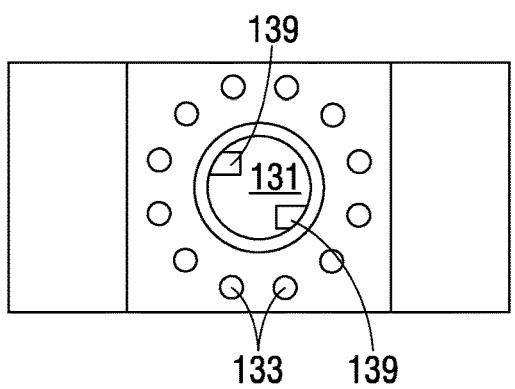
Figure 5D:
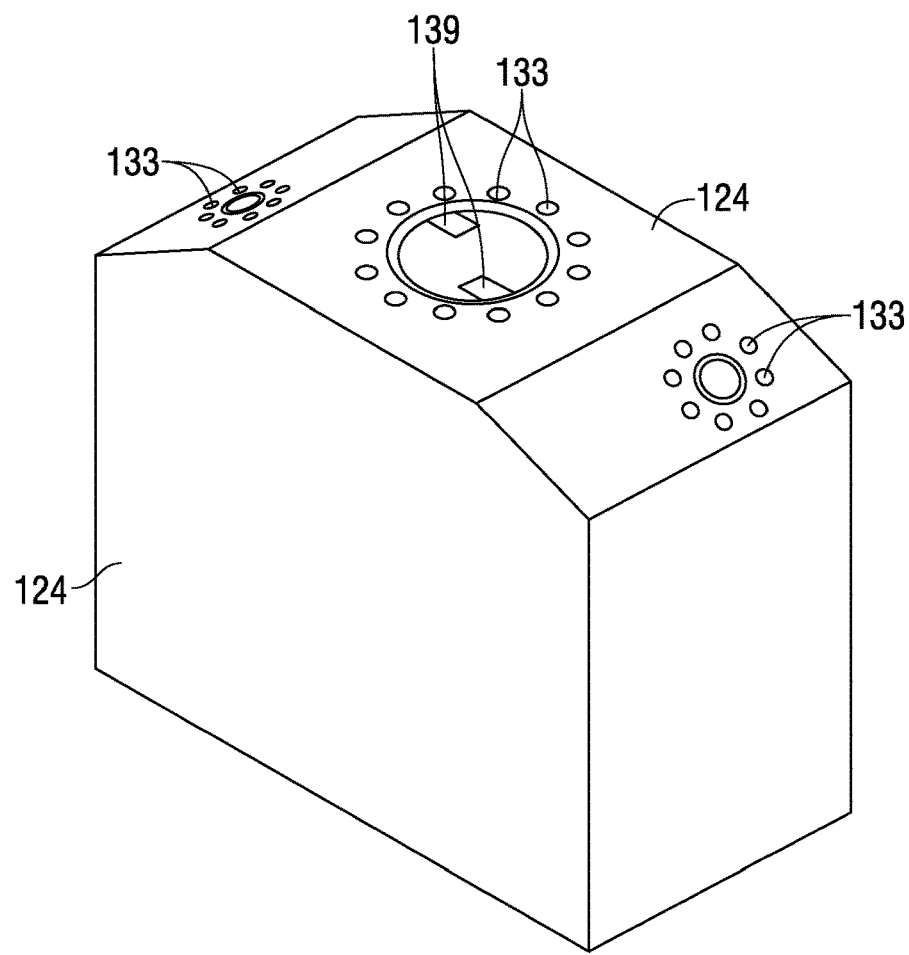
Figure 5E:
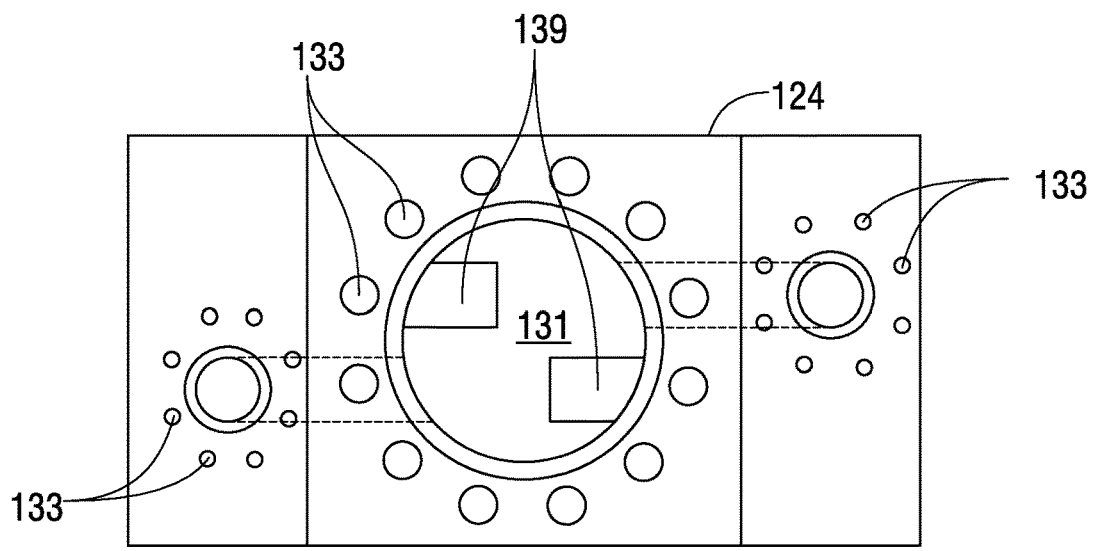

The embodiments discussed above, had the inlets engineered to be at the top of the discharge pipe section connected to the section with the lower diameter pipe or the top sections where the discharge pipe telescopes outward. In one embodiment, the inlets are designed to be installed on the wall of the discharge pipe(s), such as, sidewall. In another embodiment, flanges or studded connections can be inserted between two joint of pipe. FIGS. 4A-4C illustrates an exterior inlet suitable to be bolted to a discharge pipe and FIGS. 5A-5ED illustrate a billet that can be inserted between two joints of pipe. In addition, there other means of connecting one, or more, inlets to the discharge pipe, that can be used by persons skilled in the art with the benefit of the disclosures herein.

In various embodiments, the inlet sections can be manufactured or assembled from for example, bar stock, exterior inlets attached with bolts 133 or other attachment devices to the exterior of the pipe 125 (FIGS. 4A-4C) or billet of steel (FIGS. 5A-5E) suitable for wellheads for offshore and subsurface service. Attachment devices can include but are not limited to bolts 133, screws, fasteners, plates, latches, suction devices, and combinations thereof. Attached to the inlets 123 can be valves 122 or other fluid control devices, such as, membranes, as shown in FIG. 4B. These fluid control devices will allow favorable fluid flow into and through the inlets 123. In FIG. 4B, a housing 24 is attached with bolts 133 to the exterior 125 section of the discharge tube defined by central bore 131.

Wall or steel thickness and properties are governed by desired service pressures, temperatures, and contacting fluids. Material specifications are flexible, depending on specific design needs and environmental conditions. Manufacturing techniques are not limited to pipe, rolled steel, billet or bar steel, as there are other acceptable techniques known in the art (e.g., welded pipe members) and different suitable material such as, plastics and composites that can be formed or 3-D printed as known by persons skilled in the art.

As shown in FIGS. 5A-5E, the flange inlet embodiment includes a housing 124 with a center bore 131, one or more baffles 139 or other static mixing devices, bolts 133 for attaching additional equipment, and one or more side fluid inlet bores 123 and 128 in the housing 124 for the injection of stimulation fluid into the center bore 131. The baffles 139 or other flow devices such as, static mixers, are used to both mix the flow and achieve favorable flow properties, as described herein. As shown, the inside diameters of the side fluid inlet bores 123 and 128 can be less than the inside diameter of the center bore 31. Preferably, the side fluid inlet bores 123 and 128 are angled downwardly with respect to the center bore 131. The angle downward is shown by arrow 154 in FIG. 4B. In one embodiment, the angle can be adjustable either manually or by the control system, as described below. Additional baffles 139 and other mixing devices can be inserted into the central bore as needed, to control fluid flow and mixing, as needed.

In one embodiment, the seawater enters the inside of the center bore 131 of a tangent to the outer diameter (or the internal diameter of the casing) of the center bore 131 (as shown in FIG. 6). Preferably, the injected fluid will travel in a circular, helical flow inside the center bore 131 (as shown in FIG. 6). The helical flow can be symmetrical to the outer diameter of the center bore 131. By having the side fluid inlet bores 123 and 128 enter the center bore 131 tangent to (or at one point on the circle of) the outer diameter of the center bore 131, the fluid entering through the side fluid inlet bores 123 and 128 will enter tangentially to create the preferred helical flow inside the discharge pipe 120. The preferred helical flow will aid in mixing as the discharge water and inlet water travel through the discharge pipe.

The fluid entering the discharge pipe may possess three unique components to the fluid velocity vector as defined through an orthogonal coordinate system. For circular pipe flow geometry, these three unique velocity components may be described as 1) the normal velocity component, 2) the tangential velocity component, and 3) the longitudinal velocity component. The longitudinal velocity component is aligned with the longitudinal-axis of the discharge pipe. The normal velocity component is aligned with the normal-axis (which is in the direction both identically perpendicular to the circular wall of the discharge pipe and perpendicular to the longitudinal-axis). Finally, the tangential velocity component is understood to be aligned with the tangential-axis (which is both identically perpendicular to the normal-axis and perpendicular to the longitudinal-axis). As used herein, "tangential" or "tangentially" only requires a tangent component of the fluid flow entering the discharge pipe. Having two or more of the velocity components, as discussed above, will increase mixing.

In one embodiment, the side fluid inlet bores 123 and 128 are angled downward 141 into the center bore 131 of the discharge pipe to reduce the horizontal velocity component and angled horizontally to increase the horizontal velocity components. Preferably, the inlets should be oriented mostly downward to increase longitudinal velocity of the water flowing downward but have enough horizontal components to provide sufficient mixing of the discharge fluid with the inlet fluid. The side fluid inlet bores 123 and 128 enter the center bore 131 tangent to the inside diameter of the discharge pipe to increase radial flow mixing of the discharge fluid with the inlet fluids.

Figure 6A:
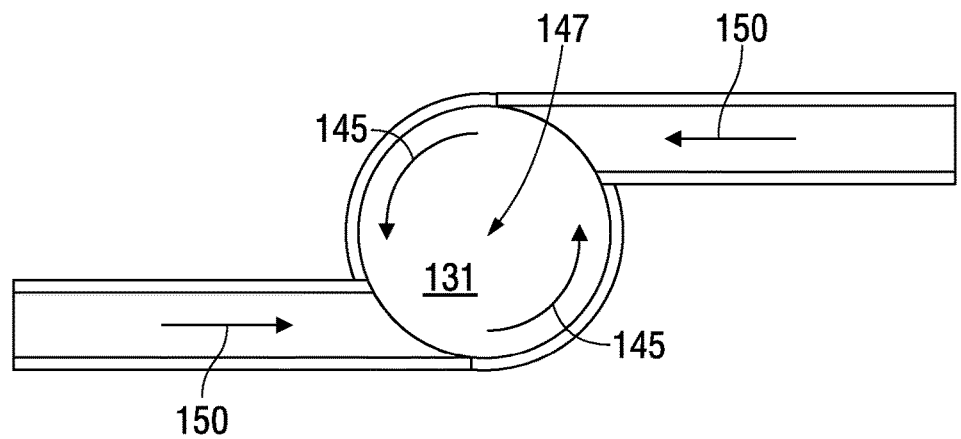
FIGS. 6A and 6B are illustrations of a downward helical fluid flow in the discharge pipe.
Figure 6B:
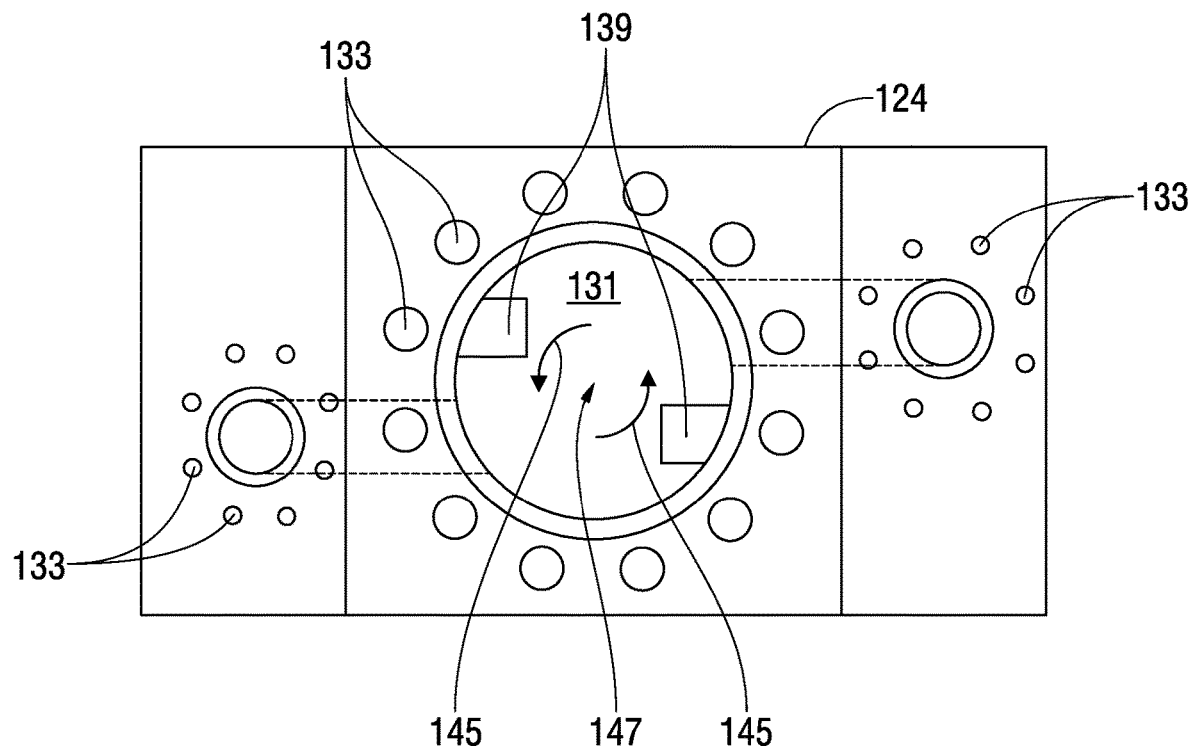

FIG. 6A and FIG. 6B illustrate the vortex or downward helical flow 145 into the discharge tubes, pipes or wellbores, shown as central bore 131. Since the side fluid inlet bores 123 and 128 have a smaller inside diameter than the center bore inside diameter, the tangential entry of the fluid leaves a "dead space" 147 in the middle of the center bore 131. The "dead space" 147 in the center bore 131 may not allow sufficient mixing. Therefore, the use of baffles, other static devices, and moveable mechanical mixing device may be necessary to allow mixing in the center and thus, eliminating the "dead space" 147, by having one or more inlets and/or baffles direct the flow directly and/or tangentially into the center of the discharge pipe. The tangential entries of the fluid from the side fluid inlet bores 123 and 128 are such that they complement each other and create a vortex in the center bore 131. This fluid vortex acts to hydraulically mix the discharge fluid with the inlet fluid. The "dead space" may be favorably used to force air down the discharge pipe to help prevent back-flow pressure and/or help remove flowing water through the outlets into the oceans, as described below. The "dead space" can be increased, by increasing the diameter of the center bore or by reducing the diameter of the side inlet bore(s). The side inlet bore(s) typically have smaller internal diameter ("ID") than the radius of the center bore, and thus, create a cylinder of "dead space" through the center bore of the discharge pipe. The diameter of this vortex or "dead space" can be reduced or increased by increasing or reducing the diameter of the side inlet bore(s). Alternatively, an inlet and/or baffle can direct water directly into the center by tangentially forcing the water in the center or "dead space" to eliminate any "dead space" and thus, further increase mixing.

Adjusting the downward angle 154 (see e.g., FIG. 4B) of the side fluid inlet bores 123 and 128 modifies the horizontal velocity of the fluid flow and geometry of the vortex. Furthermore, adjusting the orientation and number of side fluid inlet bores 123 and 128 permits greater control over the size and desired helical flow 145 geometry in the discharge pipe 120. Therefore, one skilled in the art of fluid mechanics can control velocity direction and the geometry of the helical flow 145 by manipulating the internal diameter, quantity (number of inlets), orientation and downward angles of the side fluid inlet bores 123 and 128 and using baffles and other mechanical fluid flow devices. Factors in determining favorable flow patterns include the fluid flow rate, type of fluid, how resistant the equipment is to erosion from the fluid, size of the paddles and/or other equipment encumbering the discharge pipe (such as, baffles, sensors and other equipment) in relation to the total discharge pipe diameter, salinity, and other physical property differences of the fluid, and combinations thereof.

In one embodiment, the vertical entry points of the side fluid inlet bores into the center bore can be staggered. One side inlet (e.g., inlet 123 in FIG. 4B) enters higher than the entry point of the other side inlet (e.g., inlet 128 in FIG. 4B). The purpose of this design is to provide positive, down-hole displacement of the inlet fluid. Inlet fluid which is introduced into the discharge pipes through the inlet, typically, has less salinity and thus, has lower density and would be more buoyant. The positive, down-hole movement of the inlet fluid from the top side fluid inlet bore displaces the inlet fluid down through the discharge pipe. This is particularly significant for significant density differences between discharge fluid and inlet fluid that would, typically, prevent mixing.

In the embodiment shown in FIG. 2, the paddles 25 of the hydroelectric generators 24 are strategically placed above the inlets to advantageously utilize the kinetic energy of flowing water at or above the inlets, as the energy of the mixing of the inlet water would significantly reduce potential kinetic energy of the flowing discharge water. Finally, the discharged water exits the discharge pipe 120 through one or more discharge outlets 130. If necessary, one or more discharge outlets 130 are connected to a multi-port diffuser 32, for additional mixing at the point source discharge point. In one embodiment, at least one sensor (89 in FIG. 8) before discharge outlet 130 (or 78 in FIG. 8) is used to determine the salinity, temperature, turbidity, suspended solids, and/or other properties and thus, activate the multi-port diffuser, if necessary. The sensor can be any sensor capable of determining salinity, contaminates, temperature, turbidity, suspended solids, fluid pressure, and/or other properties, including but not limited to, ultraviolet and infrared sensors, cameras, optical sensors, density sensors, light or laser sensors, electrical resistivity, sound sensors, such as ultrasonic sensors, or combinations thereof.

If the water does not exit the discharge pipe quick enough or pressure builds in a section of the discharge pipe, back-flow pressure may result and water may start to be forced back through the discharge pipes. In addition, back-flow pressure can result from the water pressure due to the depth or weight of the water above forcing water to enter discharge pipe 120 through outlet 130. Back-flow pressure, if not handled properly, would counteract the kinetic energy from the head of the water and thus, reduce or eliminate the potential to create hydroelectric power.

There are several methods that can be used alone, or in combination, to eliminate or reduce back-flow pressure. Below is a list of methods that can be utilized to reduce back-flow pressure; however, there are other methods persons skilled in the art could utilize with the benefit of the disclosure herein.

First, the telescoping discharge pipes should have sufficient ID to quickly facilitate the exit of the discharge fluid. Second, the mixing and electrical generation should be designed to substantially eliminate any unnecessary, or excessive, kinetic energy losses. This method favorably provides the flowing water enough kinetic energy for the fluids to expeditiously exit the discharge pipe. Third, pumps can be installed at the exits to quickly exit the fluid and create additional pressure to force the fluid down the discharge pipe 120. Fourth, discharge fluid flow and seawater inlet flow can be timed, or controlled, to prohibit fluid buildup and thus, reduce or eliminate any back-flow pressure. This can be accomplished by creating multiple or alternative pathways using a plurality of multiple pipe sections and then alternating the discharge between two or more alternative discharge pipe sections. Fifth, there can be several exits or outlets. Whenever, fluid flow slows and/or back-flow pressure starts to build near an outlet, at least one seal such as, a valve can shut off one or more discharge sections and/or one or more additional exits outlets paths can be opened to continuously facilitate adequate flow without significant back-flow pressure issues. Sixth, one-way valves or other flow control devices can be inserted at the point source outlets of the discharge pipe to favorably prohibit back-flow pressure from the sea water to enter the discharge pipes. Seventh, a compressed gas apparatus and system can expeditiously force out sections of water from the discharge pipe and then preferably recycle the compressed gas for future use.

Figure 7:
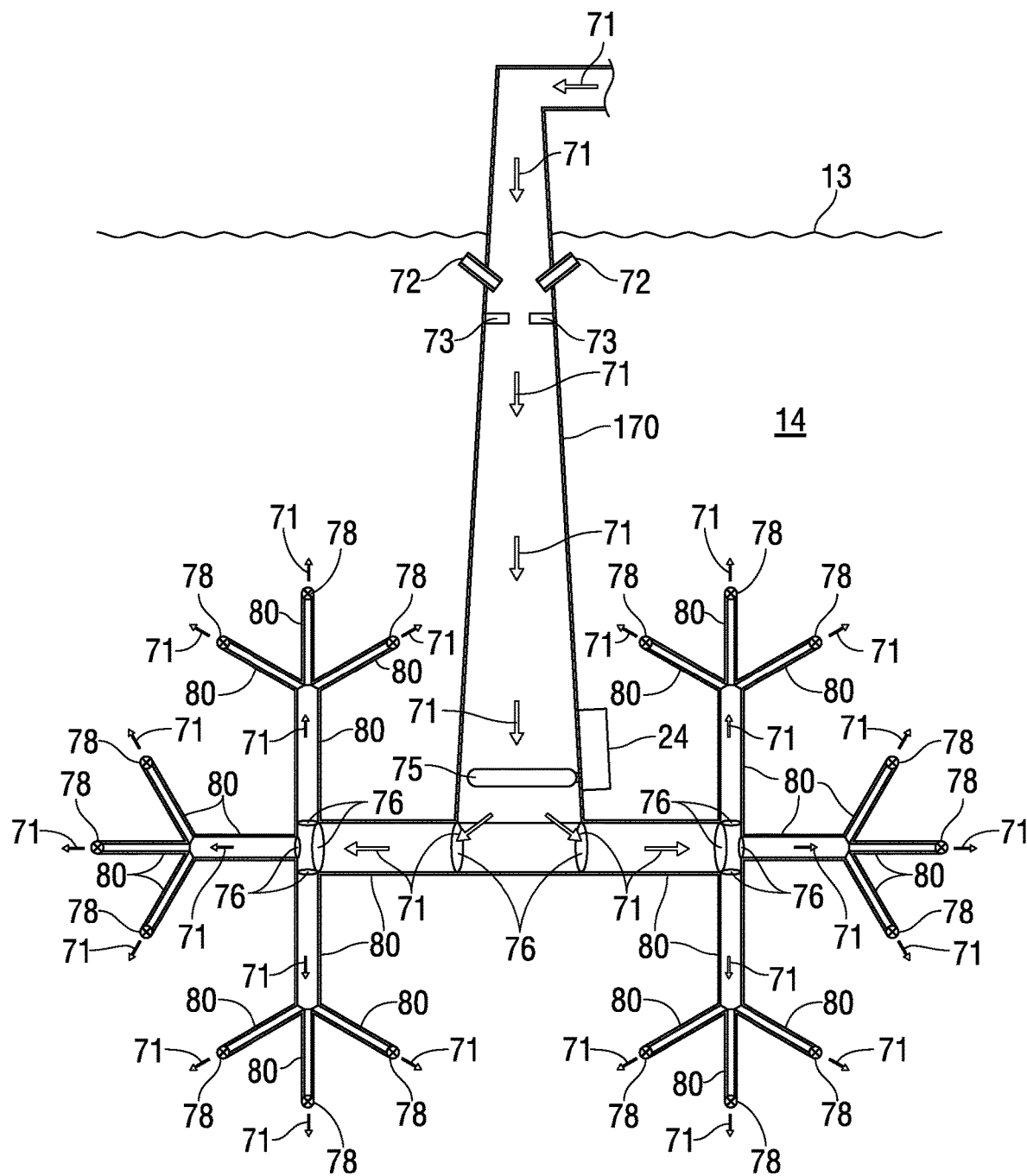
FIG. 7 is an illustration of alternative discharge pipe sections leading to multiple outlets, wherein the alternative discharge pipe sections can be sealed with the multiple seals to create alternative flow paths.

FIG. 7 is a schematic that shows several embodiments to eliminate or substantially reduce back-flow pressure. As shown in FIG. 7, the discharge pipe 70 flows discharge fluids as shown by arrow 71. The discharge pipe 70 is shown as a gradually expanding pipe diameter as depth below the sea surfaces 13 increases approaching the sea floor 12. The discharge pipe 70 is shown with two inlets 72, two baffles 73 and only one paddle 75 connected to the hydroelectric turbine generator 24. The inlets 72 are shown as mechanical funnels attached to the sidewalls of the discharge pipe 70. Additional or different inlets, paddles, baffles and generators and other equipment necessary to achieve favorable mixing can be installed, as discussed above, or as known to persons skilled in the art, with the benefit of the disclosure herein.

As shown in FIG. 7, a plurality of devices 76 for sealing off section of the pipe are installed. Suitable devices 76, for sealing off a section of pipe, include, but are not limited to, one-way valves, movable hatches, movable seals, selective flow membranes, or combinations thereof. In the embodiment shown, the opening and closing of the devices 76 are operable to seal, open or partially close fluid flow pathways to multiple alternative discharge section pipes 80 and thus, provide multiple, or alternative fluid flow pathways. At least one discharge device (not shown), which can include, but is not limited to, one-way valves, seal, hatches at the outlet, membranes or combinations thereof, can prevent ocean water 14 from flowing into the discharge pipe 120. If any back-flow pressure starts to build, at least one of the plurality of devices 76, as discussed above, can close and seal off at least one alternative section of pipe 80 before the back-flow pressure causes pressure and/or fluid flow starts to flow in the direction opposite flow arrow 71. The system can the open at least one alternative section of pipe 80 to allow continuous flow of the discharge effluent. Once the at least one of the plurality of devices 76 closes an alternative section of pipe 80, the outlet 78 and/or discharge devices (not shown) can be fully opened to allow the discharge water in the sealed section of pipe to equalize with the ocean pressure. Alternatively, ports (not shown) on the sidewall of the closed section of pipe can open to allow equalization and then the ports and/or outlets 80 can close once the water pressure is equalized, as needed. Pumps (not shown), or other fluid moving devices, can then move the discharge fluid out and draw air from the surface or section of the discharge pipe with little or no fluid. Alternatively, a compressed gas system (as shown in FIG. 8) can be installed along one, or more, of the alternative flow path section of the pipe.

In a compressed gas embodiment, the compressed gas apparatus and/or system utilizes compressed gas stored in a tank, or cylinder 81, at or near an alternative section of pipe 80, as shown in FIG. 8. An injection hose 82 connects the cylinder 81 to allow compressed gas in the cylinder 81 to flow into the alternative pipe section 80, through injection port 86, as shown by arrow 83. At, or near, the other end of the alternative pipe section 80 is an extraction port 88 connected to a return hose 94 to remove the gas to be recycled back into the gas cylinder 81 by flowing the gas, as shown by arrow 85. A seal 84 is used to seal off a section of the pipe, as discussed above. An additional outlet seal (not shown) on the outlet 78 further seals or open the outlets, as discussed above. In addition, the injection hose 82 and return hose 94 connect alternative pipe section 80 with ports (86 and 88) that seals and prevents any gas or liquid flow and/or preferentially allows the gas to flow but not any liquids, including discharge effluent. Examples of such devices, includes but is not limited to, one-way valves, movable hatches, pressure flow devices, movable seals, selective flow membranes, or combinations thereof.

A sensor 89 connected to a control system or panel (not shown) would detect pressure such as, back-flow pressure and activate the seal 84 to prevent any pressure and/or fluid flow into the main discharge pipe 120 (70 in FIG. 7) or a section of pipe leading into the main discharge pipe 120 or 70. Most likely, a plurality of sensors would be used throughout the discharge pipe 120 of FIG. 2, and the alternative pipe section 80 of FIG. 7 to detect any physical properties issues such as, abnormal pressure or salinity. The outlet 78 can be opened to release any excessive pressure into the ocean 14, as necessary. To remove the fluid, compressed gas can be injected into the alternative section of pipe 80 from cylinder 81 through injection hose 82 and then through injection port 86, as shown by arrow 83. The discharge effluent would generally flow in the direction of arrows 87. Arrows 87 show the discharge effluent flowing through alternative pipe section 80, through outlet 78 into the ocean 14. The outlet 78 can have one, or more sensors (not shown) and one, or more, discharge devices (not shown) that permits water, but not gas to flow through the outlet 78. This discharge device forces the gas through extraction port 88 through return hose 94 to return to the cylinder 81, as shown by arrow 85 when additional discharge effluent flows into the alternative section of pipe 80. In addition, pumps (not shown) can further assist the process of removing the gas through extraction port 88 and return hose 94 to return to cylinder 81.

Any remaining gas can be removed through extraction port 88, when the seal 84 is opened and more discharge water can flow through alternative pipe section 80. Accordingly, the compressed gas is recycled after each use. Additional gas can be captured from air being forced down discharge pipe 130, in the vortex, as discussed above. This air can then be pressurized and used as compressed gas to replenish any losses in compressed gas during operation. The cylinder 81 can have a refill connection 91 for refilling the cylinder by being attached to a surface tether (not shown). Alternatively, a submersible 90, or ROV, can bring a tank 92 with compressed gas with a corresponding refill connection 91 to refill compressed gas by matching, connecting and flowing compressed gas through the refill connection 91 on the submersible 90 or ROV cylinder 92 storing the compressed gas.

Wellbore Application:

The discharge system apparatus and method can be used inside a wellbore both for mixing effluent before final discharge and to recapture energy from fluids into a wellbore. In on embodiment, the mixing devices disclosed in FIGS. 5A-5E are used as wellhead devices. Additional inlets and/or mixing devices, can be placed above the wellhead and downhole as needed to create favorable fluid flow properties.

In one embodiment, the energy recapture device would be on the outside with the energy recapture device such as, the paddles or blades of the hydroelectric generator positioned inside the wellbore. Energy recovery devices ("ERD") can recapture energy expended by pumping or otherwise pressurizing water. In one embodiment, the ERD technology recovers energy from the pumping of water though industrial and municipal water distribution systems. Examples of ERD devices include, water turbines, Francis Turbine, Pelton Wheel and isobaric devices.

In another embodiment, the energy recapture device can be on the inside. For example, there are many energy recapture devices known in the art that can be used to recapture pressure from the fluid flow that can be placed inside the wellbore or discharge tubes. These devices include but are not limited to turbines and pressure recapture devices. Persons skilled in the art with the benefit of the disclosures herein, would know how to use these energy recapture devices to recapture the energy from the fluid flow in the both the wellbore and discharge tubing embodiments. Placing these devices inside the central bore of pipes or wellbores would allow the most efficient use of limited space in wellbores. Fluids injected into the wellbore can then be used to generate hydroelectric energy from the head of the wellbore. With many wellbores approaching several thousand feet in depth, this technology can recapture the energy from the fluids being disposed of in wellbores. Seals and other backflow devices and backflow methods discussed above, can be utilized to prevent backflow from creating contamination issues in the wellbore as well as preventing sufficient energy recapture.

Control Panel:

In one embodiment, a control system is provided with the apparatus and/or method to obtain favorable operation and performance of the apparatus and method. Factors to be considered for favorable operation of the apparatus and system include but are not limited to energy costs, energy production and needs, amount of brine discharge, concentration and physical properties of brine discharge, properties of sea water, design of the equipment, operational conditions of the equipment, pressure, density, temperature, other differences between the discharge brine and sea water, or combinations thereof.

In one embodiment, the controls can be standard manual or even automated controls. However, the discharge system can achieve even greater efficiencies and improved performance by using more advanced control systems, which may include a signal capture and data acquisition ("SCADA") system. SCADA is also an acronym for supervisory control and data acquisition, a computer system for gathering and analyzing real-time data. SCADA systems are used to monitor and control a plant or equipment in industries such as telecommunications, water and waste control, energy, oil and gas refining and transportation. A SCADA system gathers information, through equipment, such as sensors or gauges, transfers the information back to a central site. The central site can collect the information necessary for efficient analysis and control of the plant which includes, but is not limited to, determining if operational changes are advantageous or necessary, and displaying the information in a logical and organized fashion. SCADA systems can be relatively simple, such as one that monitors environmental conditions of a small building, or complex, such as a system that monitors all the activity in a nuclear power plant or the activity of a municipal water system. In addition, recent improvements in computer power and software configurations enable entire systems to be operated in real-time with, or without, human interaction. The real-time capabilities allow the control system to make decisions based on multiple factors and operate the water purification system favorable with little or no operator interaction.

Persons skilled in the art, with the benefit of the disclosures herein, would recognize similar monitoring and/or control systems that can be operatively connected therewith the disclosed apparatus and which may thus be used in conjunction with the overall operation of the system. The SCADA control system can utilize a computer with a display panel, keyboard, and wireless router or may include any manner of industrial control systems or other computer control systems that monitor and control operation of the system. In one embodiment, the SCADA system may be configured to provide monitoring and autonomous operation of the system.

The SCADA controlled system may be interfaced from any location on the apparatus, such as from an interface terminal. The interface terminal can include cellular or satellite communication equipment, a wired or wireless router, servers or traditional wired connections, or any combinations thereof. In the embodiment shown in FIG. 8, a sensor 89 could be connected to the interface terminal (not shown).

In an embodiment, the SCADA system including a portion or all the interface equipment and controls can be on an operations section of the apparatus. Additionally, alternatively, or as a backup, the SCADA controlled system may be interfaced remotely, such as via an internet connection that is external to the apparatus. A usable internet interface may include a viewer or other comparable display device, whereby the viewer may display real-time system performance data. In other embodiments, the SCADA system may be able to transfer data to spreadsheet software, such as, Microsoft Excel. The data may be related to temperature, salinity, heat or cooling needs, excess energy or cogenerations from industrial processes, pressure, flow rate, discharge rates, and/or other similar operational characteristics of the system.

The operations of the system may utilize several indicators or sensors, such as optical cameras, infrared cameras, ultrasonic sensors, lasers, density, electrical resistivity, sight glasses, liquid floats, temperature gauges or thermocouples, pressure transducers, etc. In addition, the system may include various meters, recorders, and other monitoring devices, as would be apparent to one of ordinary skill in the art. Sensors (202, 204, 206 and 208) are shown in FIG. 2. These sensors, shown in FIG. 2, are for the following, initial discharge stream 202, discharge stream after the first mixing inlet 204, discharge stream after the second mixing stream 206, discharge stream after the third mixing inlet, discharge stream after the fourth mixing inlet 208. One or more additional sensor(s) can be placed at the inlets to determine quantity and/or quality of the water through the inlets (not shown) and other sections throughout the discharge pipes 120 and alternative pipe sections 80. The SCADA control system can then use the plurality of sensors and controls to operate the entire discharge system.

These devices may be utilized to measure and record data, such as the quantity and/or properties of the discharge fluids such as, brine including salinity, amount of fluid flow, and type of fluid flow including turbidity including salinity directly before and after discharge. Additional sensor(s) could be placed on the turbines (not shown) to determine the operational conditions of the turbines and how much energy is produced from the turbines.

The SCADA control system may provide an operator or control system with real-time information regarding the performance of the apparatus. Any components, sensors, etc. of the SCADA system may be interconnected with any other components or sub-components of the apparatus. As such, the SCADA system can enable on-site and/or remote control of the apparatus, and in an embodiment, the system can be configured to operate without human intervention, such as through automatic actuation of the system components responsive certain measurements and/or conditions and/or use of passive emergency systems. In another embodiment, the system can operate in real-time wherein a plurality of factors or all relevant factors are instantaneously or nearly instantaneously determined and used to calculate the most favorable operations. This real-time operation allows all components to be operated in a coordinated manner based on information received and responded to in real-time including instantaneously, or nearly instantaneously. For example, the inlets (150 and 6), for the plant (not shown) or other equipment on the barge platform 2 and the devices throughout the discharge pipe 120 can all be operated in a synchronized coordinated manner to achieve favorable operational efficiencies.

The system may be configured with devices to measure "HI" and/or "LOW" temperatures, density, salinity pressure, turbidity sensors, or flow rates. The use of such information may be useful as an indication of whether increase mixing by changing the orientation of the baffles or mechanical mixing devices, or as an indication for determining whether the fluid flow rate should to be increased or decreased by controlling flow by partially or fully opening or closing the inlets 27, or seals 80. Alternatively, the information could be used to determine which fluid streams would create the most advantageous mixing by creating tangential and/or radially flow by controlling the inlets 27 and/or baffles 28 or other mechanical mixing devices, and/or seals (76 from FIG. 7). The system may also be coupled with heat, pressure, and liquid level safety shutdown devices, which may, or may not, be accessible from remote locations, such as the inlets (150 and 6), the industrial energy or external heat source (not shown) on the operating equipment, and the discharge pipes for safety and to achieve further efficiency.

The SCADA system may include several subsystems, including manual or electronic interfaces, such as a human-machine interface (HMI). The HMI may be used to provide process data to an operator, and as such, the operator may be able to interact with, monitor, and control the apparatus. In addition, the SCADA system may include a master or supervisory computer system such as, a server or networked computer system, configured to gather and acquire system data, and to send and receive control instructions, independent of human interaction such as real-time, as described below. A communication device or digital port or remote terminal ("RT") may also be operably connected with various sensors. In an embodiment, the RT may be used to convert sensor data to digital data, and then transmit the digital data to the computer system. As such, there may be a communication connection between the supervisory systems to the RT's. Programmable logic controllers ("PLC") may also be used to create a favorable control system. The RT and PLC would most likely, but would not necessarily, be in the interface terminal data acquisition of the system, which may be initiated at the RT and/or PLC level, and may include, for example, gauges or meter readings such as, temperature, pressure, density, equipment status reports, etc., which may be communicated to the SCADA, as requested or required. The requested and/or acquired data may then be compiled and formatted in such a way that an operator using the HMI may be able to make command decisions to effectively run the apparatus and/or method at great efficiency and optimization. This compilation and formatting of data can be used to enable real-time operations, as discussed below.

In an embodiment, all operations of the system may be monitored via control system or in a control room within the operations section. In various embodiments, the operations section may be mounted on the discharge pipes 120, ship 3 or barge platform 2, as shown in FIG. 2. Alternatively, or additionally, the system can be operable remotely and/or automatically.

The invention claimed is:

1. An apparatus comprising:
   a. a central bore having an internal diameter suitable for a fluid flow, wherein the fluid flow moves inside the central bore through the apparatus;
   b. a plurality of outlets, wherein the fluid flow exits the apparatus through at least one outlet and a plurality of inlets oriented for flowing at least a portion of the fluid flow tangentially to the central bore to create a helical flow to mix the additional fluid with the fluid flow in the central bore;
   c. multiple alternative flow paths, wherein the multiple alternative flow paths are connected to the central bore and the plurality of outlets for exiting the fluid flow from the central bore and at least one seal for sealing at least one flow path to prevent back-pressure from reversing the fluid flow direction; and
   d. at least one energy recapture device to capture at least a portion of the energy of the fluid flow through a section of the apparatus.

2. The apparatus of claim 1, wherein the apparatus is a discharge device and at least one device inside the discharge device is a baffle to mix the fluid flow with additional fluid introduced to the central bore through at least one inlet.

3. The apparatus of claim 1, wherein the apparatus is a discharge device connected to an offshore device and the fluid flow comprises waste-water.

4. The apparatus of claim 3, wherein the waste-water is brine discharge and the additional fluid is salt water and the helical flow will reduce salinity of the fluid flow in the central bore by mixing the salt water with the brine.

5. The apparatus of claim 4, further comprising at least one structural device inside the central bore to mix the salt water and the brine.

6. The apparatus of claim 1, further comprising at least one energy recapture device to capture at least a portion of the energy of the fluid flow through the central bore.

7. The apparatus of claim 1, further comprising a hydro-electrical device that converts the fluid flow through the central bore to electrical power.

8. The apparatus of claim 5, further comprising at least one pressure recapture device to capture at least a portion of the energy of the fluid flow through the central bore.

9. The apparatus of claim 5, further comprising a hydro-electrical device that converts the fluid flow through the central bore to electrical power.

10. The apparatus of claim 1, further comprising a plurality of inlets for flowing additional fluid to the central bore.

11. The apparatus of claim 9, further comprising at least one additional seal for sealing at least one additional flow path to prevent back-pressure from reversing the fluid flow direction and at least one fluid moving device to move water from a sealed flow path.

12. The apparatus of claim 1, wherein the central bore of the apparatus is a subterranean wellbore.

13. A method to capture energy from fluids comprising;
   a. obtaining a discharge device comprising a central bore having an internal diameter suitable for a fluid flow, wherein the fluid flow moves inside the central bore through the discharge device, a plurality of outlets, wherein the fluid flow exits the discharge device through at least one outlet, at least one inlet for flowing fluid to the central bore, at least one seal for sealing at least one flow path to prevent back-pressure from reversing the fluid flow direction, at least one energy recapture device to capture at least a portion of the energy of the fluid flow through either the central bore, or the plurality of outlets, wherein the discharge device further comprises at least one additional seal for sealing at least one additional flow path to prevent back-pressure from reversing the fluid flow direction and at least one fluid moving device to move water from a sealed flow path;
   b. flowing the fluids through the inlet into the apparatus;
   c. capturing energy from the fluid flow using the energy recapture device;
   d. sealing at least one flow path to prevent back-pressure from reversing the fluid flow direction;
   e. sealing a second flow path with the one additional seal; and
   f. moving water from a sealed flow path by using the fluid moving device.

14. The method of claim 13, further comprising mixing the fluids with at least one structural device inside the central bore.

15. The method of claim 13, further comprising generating electricity from the fluid flow through at least one generator attached to the central bore with a device for capturing the energy in the fluid.

16. The method of claim 13, further comprising capturing the energy of the fluid flow through the central bore with an energy recapture device.

17. The method of claim 13, wherein the fluid is brine discharge and the additional fluid is salt water and further comprising reducing salinity of the fluid flow in the central bore by mixing the salt water with the brine.

18. A system comprising:
   a. a central bore having an internal diameter suitable for a fluid flow, wherein the fluid flow moves inside the central bore through the system;
   b. plurality of outlets, wherein the fluid flow exits the system through at least one outlet;
   c. at least one inlet for flowing fluid to the central bore;
   d. multiple alternative flow paths, wherein the multiple alternative flow paths are connected to the central bore and the plurality of outlets for exiting the fluid flow from the central bore and at least one seal for sealing at least one flow path to prevent back-pressure from reversing the fluid flow direction, wherein the system further comprises at least one additional seal for sealing at least one additional flow path to prevent back-pressure from reversing the fluid flow direction and at least one fluid moving device to move water from a sealed flow path;
   e. at least one energy recapture device to capture at least a portion of the energy of the fluid flow through the either the central bore, the multiple alternative flow paths or the plurality of outlets;
   f. at least one sensor for detecting back-pressure; and
   g. a control panel that controls the fluid flow and the at least one seal for sealing at least one flow path in a coordinated manner with the at least one sensor for detecting back-pressure to achieve energy recapture.

19. The system of claim 18, further comprising a plurality of inlets oriented for flowing at least a portion of the fluid flow tangentially to the central bore to create a helical flow to mix the additional fluid with the fluid flow in the central bore.

20. The apparatus of claim 1, further comprising at least one additional seal for sealing at least one additional flow path to prevent back-pressure from reversing the fluid flow direction and at least one fluid moving device to move water from a sealed flow path.

\* \* \* \* \*